United States Patent [19]

Schefer et al.

[11] 4,213,573
[45] Jul. 22, 1980

[54] AIR COUPLING

[75] Inventors: Kurt Schefer; Jakob Fluck, both of Winterthur, Switzerland

[73] Assignee: Reiter Machine Works, Ltd., Winterthur, Switzerland

[21] Appl. No.: 18,103

[22] Filed: Mar. 7, 1979

[51] Int. Cl.³ .................. B65H 54/02; B65H 54/40; B65H 67/04
[52] U.S. Cl. .................................. 242/18 A; 137/798; 242/18 R; 242/18 DD
[58] Field of Search ............ 242/18 A, 18 DD, 18 R, 242/35.5 R, 35.5 A, 35.6 R, 46.2, 46.4; 137/798, 802, 799

[56] References Cited

U.S. PATENT DOCUMENTS

| | | | |
|---|---|---|---|
| 3,310,247 | 3/1967 | Emery | 242/18 A |
| 3,495,781 | 2/1970 | Graf et al. | 242/46.4 |
| 3,761,029 | 9/1973 | Seney | 242/18 A |
| 3,841,574 | 10/1974 | Lenk et al. | 242/18 A X |
| 3,856,222 | 12/1974 | Wust | 242/18 A |
| 3,921,922 | 11/1975 | Wust | 242/18 A |
| 4,023,743 | 5/1977 | Schippers | 242/18 A X |
| 4,033,519 | 7/1977 | Abe et al. | 242/18 A |
| 4,103,833 | 8/1978 | Hasegawa et al. | 242/18 A |

*Primary Examiner*—Stanley N. Gilreath
*Attorney, Agent, or Firm*—Kenyon & Kenyon

[57] ABSTRACT

A bobbin revolver for winding textile filaments has a rotatable chuck carrier with a plurality of bobbin chucks. The carrier is rotatable on a central shaft to urge the chucks successively towards a friction drive drum which rotates bobbins on the chucks to wind filament packages thereon. A fluid coupling, comprising co-axial, relatively rotable parts having communicating passages therethrough, is provided around the shaft to pass pressure fluid to and/or from devices on the carrier. The fluid coupling is arranged so that there is no relative rotation of its parts during winding of a package, thereby avoiding disturbance of the contact pressure between a package and the friction drum through sliding friction between the coupling parts.

12 Claims, 3 Drawing Figures

AIR COUPLING

BACKGROUND OF THE INVENTION

The present invention relates to a fluid coupling for use with textile machines, particularly but not exclusively filament winders of the type known as bobbin revolvers.

A bobbin revolver is a machine for winding synthetic filaments; the latter term is here intended to cover continuous lengths of mono-filamentary and multi-filamentary materials. Such materials must be continuously wound on a suitable bobbin tube as they leave the spinneret or a preceding process. A bobbin revolver is designed to carry a plurality of bobbin tubes (usually two) so that when a yarn package upon one of the bobbin tubes is complete, the yarn can be quickly transferred to another tube of said plurality and winding can continue without interruption. Such machines are already well known in the filament winding art; one example of such a machine is described in the British Pat. No. 1,332,182. A development of that machine is described in recently filed U.S. Patent Application Ser. No. 945,330 herein referred to as prior Application. The full disclosure of British Patent No. 1,332,182 and the prior application is hereby incorporated in the present specification by reference.

The machines described in the Patent and prior application above referred to are of a generally known type comprising a positively driven drum as the main drive element for the bobbin tubes. The bobbin tubes can be brought successively into a winding condition in frictional contact with the drive drum, the tubes themselves being mounted on respective chucks which are freely rotatable on chuck shafts provided on the revolver. In such a machine it is desirable to maintain a controlled pressure between the friction drive drum and the bobbin tube or package thereon during a wind. While it is not essential to hold this pressure precisely constant, it is highly desirable that the pressure be held within certain definite limits dependant upon the particular machine or type of yarn to be wound.

Movement of bobbin tubes between winding and non-winding conditions involves rotation of a chuck carrier about a predetermined axis. There is almost always at least one fluid operated device on the rotatable chuck carrier. For example, each chuck will include a clamping device for releasably clamping a bobbin tube in place thereon; it is conventional practice to operate this clamping device by compressed air, at least to cause release of the bobbin tube even if the main clamping effect is achieved by spring operated means. In the more highly developed bobbin revolver described in the prior application, there is in addition a plurality of piston and cylinder units designed to enable adjustment of the positions of the individual chucks on the chuck carrier. Attention is drawn to these fluid operated devices by way of example only; the precise purpose for which pressure fluid is required on the chuck carrier is not important to the present invention.

There is another known form of bobbin revolver in which there is a demand for pressure fluid on a rotatable chuck carrier, namely that described in Japanese Utility Model No. 8739/53 (published Mar. 7, 1978). That specification describes a form of fluid coupling comprising a collar fitted to and rotatable with a shaft which rotates the chuck support. The collar is located within a sleeve and is provided with a plurality of annular grooves facing outwardly towards the sleeve. A corresponding plurality of O-ring seals are provided between the collar and the sleeve so that the grooves are isolated from each other. A plurality of passages lead from respective grooves through the collar to respective tubes which in use communicate with the pressure fluid operated devices on the chuck carrier. Also, a plurality of openings in the sleeve pass from respective grooves to the exterior of the sleeve. The latter is connected to the fixed housing of the machine, so that tubes can be connected to the exterior openings to enable pressure fluid to be fed to the associated grooves. With such an arrangement, the pressure operated devices on the chuck support can be supplied with operating fluid at any angular disposition of the chuck support because the passages in the collar are in permanent communication with their respective grooves.

The bobbin revolver shown in Japanese specification differs, however, from the other revolvers referred to above, in that the chuck shafts are positively driven by individual motors which are mounted on the chuck support. Accordingly, that machine does not require a friction drive drum, and there is no need for accurate control of a winding pressure exerted between the friction drive drum and a bobbin tube or package driven thereby. There is a substantial disadvantage to the fluid coupling described in the Japanese specification when it is applied to a bobbin revolver adapted for use with a friction drive drum and in which it is desired to maintain in use a controlled force urging a chuck towards a friction drive drum by way of the operating system for rotating the chuck carrier. Sliding friction between the two elements of the coupling, the collar and sleeve referred to above, is substantially uncontrollable and produces unacceptable variations in the winding pressure between different machines and possibly even on the same machine between different operating conditions. The machine manufacturer is therefore faced with the problem of individually adjusting each machine to take account of the individual friction performance of the fluid coupling in that machine, and the machine user may be faced with the problem of adjusting the machine to account for different operating circumstances over time.

PRESENT INVENTION

It is an object of the present invention to provide a modified form of coupling which enables the above disadvantage to be avoided. The invention provides a fluid coupling comprising first and second parts rotatable relative to each other about a predetermined axis, at least one channel defined between the parts, a fluid passage in the first part and a fluid passage in the second part said fluid passages communicating with said channel to permit transfer of pressure-fluid from one passage to the other via said channel, the first and second parts being rotatable together in at least one direction about said predetermined axis through a predetermined angle of rotation about said axis and the first part being rotatable in the same direction through a larger angle then the second part.

When a fluid coupling of the above type is included in a bobbin revolver, it can be arranged so that the two parts rotate together (in the same direction) during winding of a package, and hence there is no sliding friction in the coupling to affect the winding pressure between the package and a friction drive drum. The parts are, however, free to rotate relative to each other during other stages of operation of the bobbin revolver, for example during movement of the chucks between the winding and the non-winding conditions. It will be understood that such a fluid coupling on a bobbin revolver will normally have more than one channel and each channel will have its respective pressure fluid inflow and outflow passages associated therewith. There could be five such channels as illustrated in the Japanese specification above referred to or any other number depending upon the requirements for individual pressure fluid supplies and the space available for and within the fluid coupling.

With such a system, it is possible to control the winding pressure by applying a suitable turning moment to the chuck carrier tending to turn it about its axis in a direction urging the chuck in the winding condition towards the friction drive drum. The chuck carrier will in fact rotate about its axis so that the chuck in the winding condition moves away from the friction drive drum during winding of a package thereon (against said applied turning moment) because of the gradually increasing diameter of the package. The air coupling can be so arranged that the parts thereof are rotatable together throughout winding of a package so that the applied turning moment is unaffected by sliding friction between said parts.

Since both parts of the coupling are now rotatable relative to the machine frame, any tube leading from the coupling to a part fixed to the machine frame must be flexible or at least include a flexible portion. Limits should be placed upon rotation of a coupling part having such tubes connected thereto and these limits will normally permit a rotation of such a coupling part through less than 360° and preferably less than 180°. Arrangements may therefore be made to return such a coupling part from its angular disposition at the completion of winding a package to a starting disposition suitable for winding of the next package. Preferably such arrangements are incorporated into the general operating mechanism of the machine so that the return motion does not require an additional drive system. Where, as is conventional, the bobbin revolver itself is driven by a reversible drive system, for example comprising a piston and cylinder unit, the return for said returnable coupling part may be associated with said reversible drive system. Said coupling parts may rotate together by reason of static frictional forces between them during rotation of the chuck carrier while a package is being wound. At completion of winding of a package said returnable coupling part may be engaged by said reversible drive system travelling in a predetermined direction to return it to its starting position. The other coupling part will normally continue to rotate in the same direction as the full package is moved away from the friction drive drum during bobbin tube exchange. Where there is a reversible drive system for the bobbin revolver, there may be a free wheel connection between the drive system and the chuck carrier. However, the fluid coupling of the present invention is not limited to use with revolvers of this type since the chuck carrier itself could be reversibly rotatable. In any event, the degree of rotation of the coupling part fixed to the chuck carrier will normally be substantially greater in a given direction than the degree of rotation required of the other coupling part in the same direction.

BRIEF DESCRIPTION OF THE DRAWINGS

By way of example one embodiment of the invention will now be described with reference to the accompanying diagrammatic drawings, in which.

DETAILED DESCRIPTION OF THE INVENTION

Figure 1:
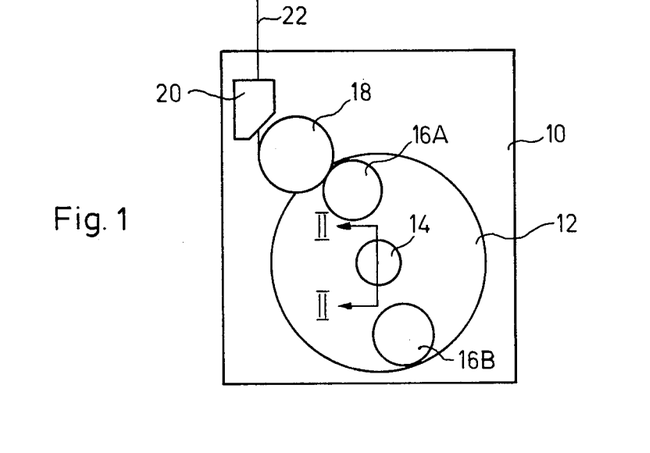
FIG. 1 is a diagrammatic end elevation of a bobbin revolver.

Since the details of the bobbin revolver construction are not essential to the present invention, FIG. 1 shows only the important elements of a bobbin revolver in schematic form. The machine comprises a frame 10 providing bearings (not shown) for a main shaft 14 to which a chuck carrier or support 12 is secured for rotation with the shaft about the longitudinal axis of the latter. Carrier 12 supports two chucks 16 A and 16 B. Although the details of these chucks are not illustrated, each chuck comprises a chuck shaft projecting in cantilever fashion from carrier 12; a bobbin tube receiving structure mounted for rotation about the longitudinal axis of the chuck shaft; and a bobbin tube clamping system for releasably securing a bobbin tube to the receiving structure for rotation therewith during winding of a package and operable to release the bobbin tube at the completion of winding to enable its removal from the chuck and replacement of the full bobbin tube with an empty tube.

The bobbin revolver also comprises a friction drive drum 18 which is mounted in bearings in frame 10 and can be driven (by means not shown) around its own longitudinal axis. Further, there is a traverse mechanism 20 which receives a filament 22 from a spinneret (not shown) and reciprocates the filament longitudinally of drive drum 18. In use, a bobbin tube or package on a chuck 16 in the winding condition is urged against drive drum 18 and is rotated around the chuck shaft through frictional contact with the drum. After leaving traverse mechanism 20, filament 22 is led around a portion of the circumference of drum 18 before being wound on the bobbin tube on chuck 16. The bobbin tube is driven at a constant peripheral velocity equal to the controlled peripheral velocity of drive drum 18. Filament 22 is therefore drawn forward at a substantially constant speed longitudinally of itself. Traverse of the filament axially of drum 18 and the bobbin tube by traverse mechanism 20 causes winding of the filament into the package at a predetermined wind-angle controlled by the relationship between the traverse speed and the speed of movement of the filament longitudinally of itself.

As indicated above, it is desirable to maintain a substantially constant (or at least controlled) winding pressure between the bobbin tube/package and friction drive drum 18. This is done by applying a predetermined torque to shaft 14 tending to turn carrier 12 in an anti-clockwise direction as viewed in FIG. 1, urging the chuck 16 in the winding condition towards drive drum 18.

As the package diameter increases, however, the chuck must move away from drive drum 18 and chuck carrier 12 is rotated in a clockwise direction as viewed in FIG. 1, against the applied torque, to permit buildup of the package.

Upon completion of winding of the package on one chuck 16, carrier 12 is rotated so as to bring the second chuck into the winding condition and to move the first chuck into a position where the full package can be removed from the chuck. In the course of this rotation of chuck carrier 12, filament 22 is transferred from the first to the second chuck and severed inbetween them. Arrangements for effecting such transfer are already well known and form no part of this invention, so that they will not be described herein. After release of the clamping mechanism of the first chuck, the full package can be removed from the chuck and replaced by an empty bobbin tube ready for a similar exchange upon completion of a package on the second chuck.

Figure 2:
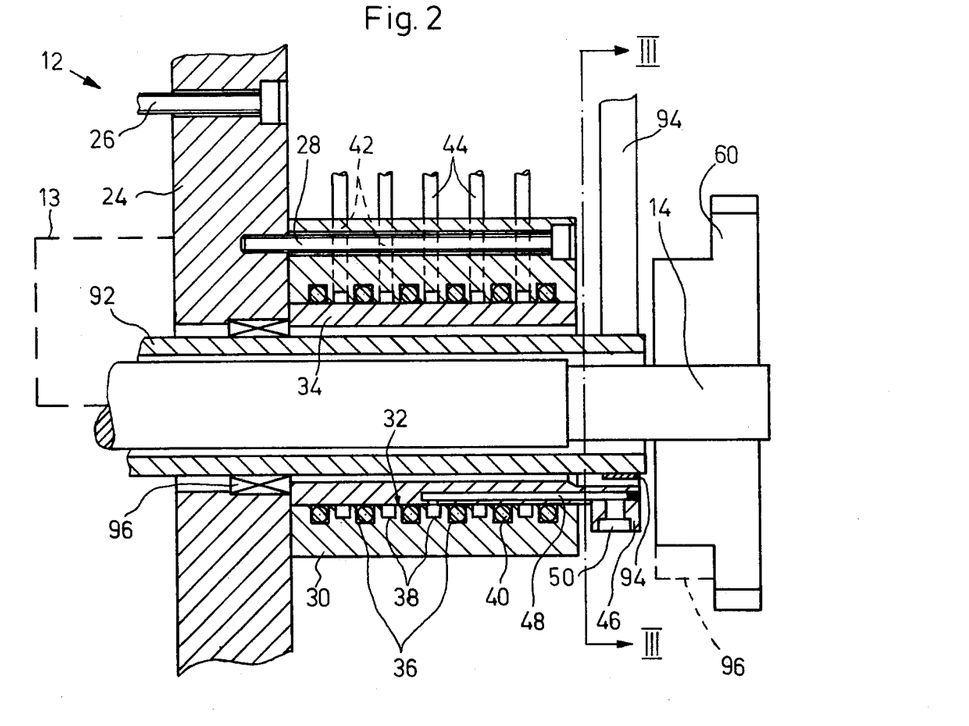
FIG. 2 is a side elevation in section of a fluid coupling mounted on the bobbin revolver shown in FIG. 1, the section corresponding with the line II—II in FIG. 1.

It is conventional practice to have pneumatically operable clamping mechanisms for the individual chucks 16. In addition, there may be other fluid operated devices (preferably pneumatically operable) mounted on the carrier 12. While the present invention is not limited to use with the bobbin revolver described in the prior application, reference to that application will show that there is a demand for supply of air to a plurality of piston and cylinder units enabling controlled pivotal movement of each chuck 16 on the carrier 12. There may be other demands for pressure fluid (hydraulic or pneumatic) on carriers 12 of different design. A fluid coupling is required to supply such demand and FIG. 2 shows a fluid coupling suitable for supplying operating fluid to devices mounted on the carrier 12 of the bobbin revolver shown in FIG. 1.

FIG. 2 again shows the main shaft 14 together with a portion of a carrier 12 suitable for the revolver described in the prior application; since details of the carrier are not important to this invention, only a mounting plate 24 which serves as a member rotatable about an axis is shown to which the fluid coupling itself is secured and which other portions of the carrier 12 are secured by connectors 26 extending to the left as illustrated in FIG. 2. The bearings by which carrier 12 is mounted in frame 10 are provided in those other, non-illustrated portions to the left of the parts seen in FIG. 2, and a connection (diagrammatically indicated at 13) between shaft 14 and carrier 12 is also made in the non-illustrated portions. It will be understood, that through the non-illustrated connections, plate 24 is rigidly secured to shaft 14 for rotation therewith.

Secured to plate 24 by means of pins 28 is a housing 30, having a generally cylindrical bore 32. A sleeve 34 is located in the bore 32 with the external surface of the sleeve 34 contacting surfaces of the housing 30 as will be further described below.

The bore 32 of housing 30 is provided with two series of annular grooves. The first series comprises six grooves or channels indicated by numeral 36 and the second series comprises five grooves indicated at 38. Grooves 38 alternate with grooves 36 along the axis of the housing 30, with a groove 36 adjacent each axial end of the housing. Grooves 36 are slightly deeper than grooves 38 and they receive O-ring seals 40, which contact the external surface of the sleeve 34 and thereby prevent passage of fluid from one groove 38 to the next by leakage between the housing 30 and sleeve 34. Housing 30 also has five bores 42 extending from the external surface of the housing to communicate with respective grooves 38. The remaining surface of bore 32 is in the form of a series of lands between grooves 36 and 38 and these lands are in sliding contact with the external surface of sleeve 34.

At its end remote from plate 24, sleeve 34 has a projection 46 extending axially and radially beyond bore 32 of housing 30. The projection is segment-shaped, extending around only a portion of the periphery of sleeve 34 as indicated by the diagram in FIG. 3. Five axial bores 48 (only one of which can be seen in FIG. 2) extend through the sleeve 34 and projection 46, being spaced circumferentially around the sleeve 34. The bores 48 extend to different axial depths of sleeve 34 and have side passages to enable them to communicate with respective grooves 38 in housing 30. Bores 48 also communicate with respective side passages 50 extending radially through the projection 46.

In use, five flexible tubes 52 (FIG. 3) are connected to respective side passages 50 and also to one or more sources of compressed air located on a fixed machine frame. The tapping passages 42 in housing 30 are connected via suitable leads 44 to respective pneumatically operated devices (not shown) on carrier 12, which devices exhaust to atmosphere. Since housing 30 is rigidly fixed to plate 24, the leads 44 will not be required to flex to any substantial extent in use. The leads 52 to passages 50 will, however, be required to flex substantially as will be described below. Although not shown in FIG. 2, projection 46 has secured thereto to plate 47 (FIG. 3) which lies between the leads 52 and the housing 30.

Although the structure of the revolver is generally the same as that described in prior application, there is a difference in the system for rotating the shaft 14. In the prior application, a pair of pneumatic cylinders operated directly upon a disc secured to the end of the shaft. In the construction shown in FIGS. 2 and 3, the driving power for rotating shaft 14 is derived from a single pneumatic cylinder 53 (FIG. 3) fixed to the machine frame and reciprocating a piston 54 with a connecting rod 56 secured thereto. This reciprocating drive is converted to rotation of shaft 14 via a rack 58 secured to connecting rod 56 and a pinion 60 rigidly secured to shaft 14. The rack 58 is formed on a slider 62 which can slide along a guide rod 64 mounted at its upper end in a coupling 66 which can pivot in a portion 68 of the machine frame. At its lower end rod 64 is pivotally secured to a connecting rod 70 and thence to the piston 72 of a second piston and cylinder unit. When piston 72 is drawn to the left in its cylinder 74 (as viewed in FIG. 3), rack 58 engages with pinion 60 and the drive from piston 54 is transmitted to shaft 14. When piston 72 is moved to the right as viewed in FIG. 3, rack 58 is disconnected from pinion 60 and movement of piston 54 does not result in rotation of shaft 14.

Figure 3:
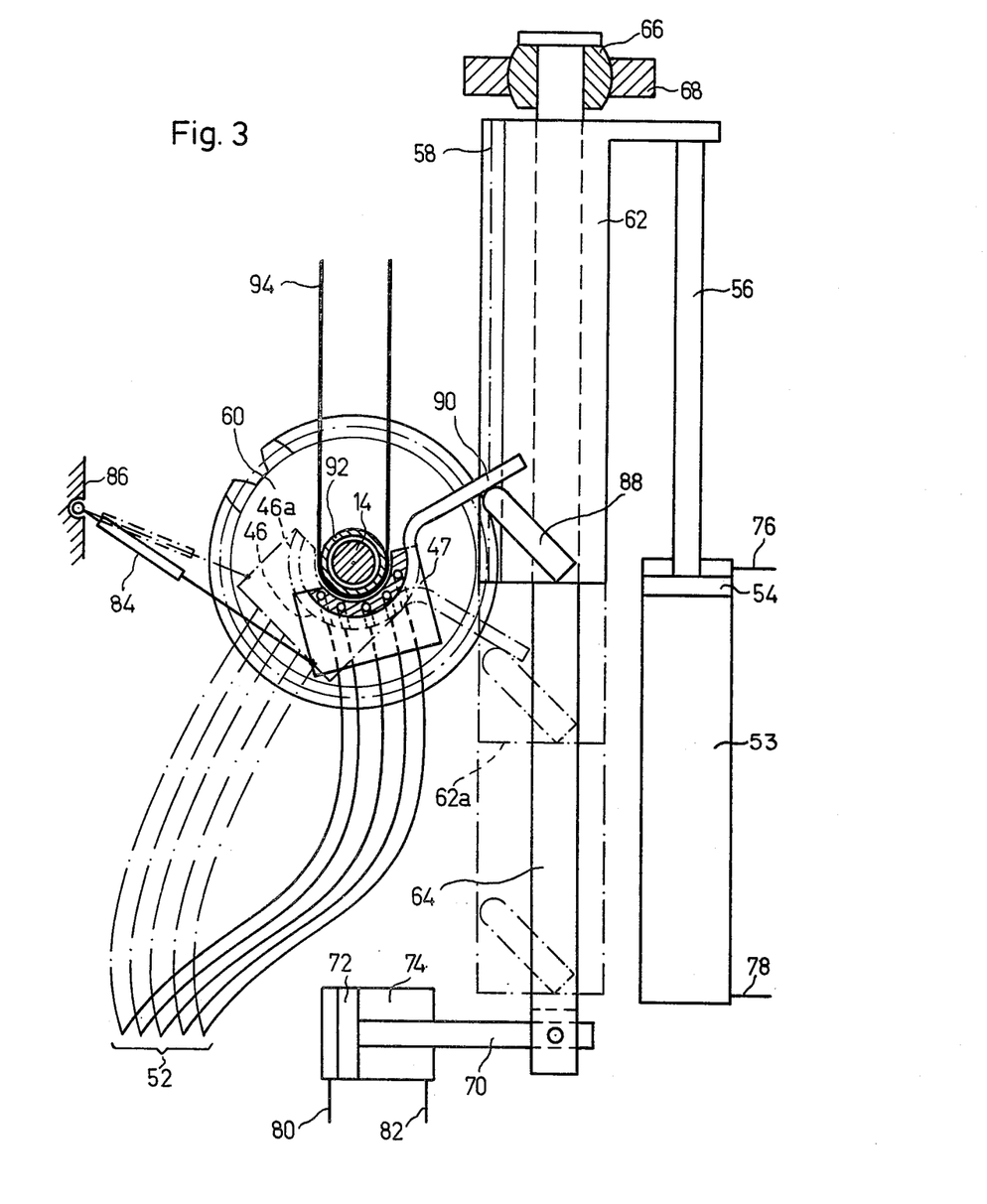
FIG. 3 is a diagrammatic section on the plane III—III in FIG. 2 and showing part only of the fluid coupling and bobbin revolver for the purpose of description of the sequence of operations of the various elements.

Both of the cylinder and piston units 53–54, 72–74 are double-acting, as indicated by the pressure leads 76, 78, 80, 82, to the ends of cylinders 53, 74 in FIG. 3. The pressurisation of those leads is under the control of a central control unit (not shown) which operates to produce the following sequence after first contact of a bobbin tube on, say, chuck 16 A with friction drive drum 18, that is after the start of winding of a package on chuck 16 A. Firstly, lead 82 is pressurized and lead 80 is opened to permit the piston 72 to draw rack 58 into contact with pinion 60. At this stage, slider 62 is at its uppermost position on guide rod 64, as indicated in full lines in FIG. 3, and lead 78 is pressurized at a substantially predetermined value tending to hold slider 62 and rack 58 in this uppermost position. Rack 58 is therefore urging pinion 60 in an anti-clockwise direction tending to apply chuck 16 A against friction drive drum 18, the torque on shaft 14, and hence the force urging chuck 16 A towards the drum 18, being determined by the pressure applied at lead 78.

As the size of the package increases, chuck 16 A is forced away from drum 18, rotating shaft 14 and pinion 60 in a clockwise direction as viewed in FIG. 3 against the applied torque. Leads 76 and 78 permit flow of air into and out of cylinder 53 such that the applied torque remains substantially constant and varies in a substantially predetermined fashion during the wind. Slider 62 is therefore forced downwardly reaching on intermediate position 62a, indicated in dash-dot-lines, at the completion of winding of a package. During this same period, plate 24 and housing 30 will be driven through the same angle as shaft 14 and pinion 60.

Because of the static friction between housing 30 and the sleeve 34, caused by the O-ring seals 40 and contact of the sleeve 34 with the lands in the bore 32 of the housing, the sleeve is carried along with housing 30. Projection 46 on the sleeve rotates from the full line position (FIG. 3) at the start of a wind to the position 46a indicated in dash-dot-lines. Leads 52 must flex correspondingly. Also a telescopic member 84, which is pivotally connected to the projection 46 and to a part 86 of the machine frame, pivots from the full line position to the dotted line position where the limit of its contraction prevents further rotation of projection 46 and therefore avoids any risk of snagging of leads 52 on other parts of the machine. It will be noted, however, that throughout winding of a package on the chuck 16 A there is no relative rotation of housing 30 and sleeve 34 and therefore no sliding friction between those parts. Accordingly, none of the motive power derived from cylinder 53 as a source of motive power is taken up in overcoming such sliding friction, and the torque applied to shaft 14 during winding of a package is accurately determined by the pressure applied to the lead 78.

At the completion of winding of the package, carrier 12 must continue to rotate in the same direction as it has rotated during the wind in order to carry the package away from drive drum 18 and to bring chuck 16 B into the winding condition. Accordingly, when slider 62 is at the intermediate position 62a, lead 76 is pressurized and lead 78 is depressurized so that pinion 60 continues to rotate in a clockwise direction but now under the motive power of the pressure in the upper chamber of cylinder 53. This motion continues until slider 62 reaches the lower end of guide rod 64 as shown in dash-dotted lines in FIG. 3. Since projection 46 and sleeve 34 are now stationary relative to the machine frame, there is relative rotation between the sleeve 34 and housing 30. However, since winding of the package is now complete, the disturbing influence of this sliding friction has no effect upon quality of the package.

Lead 80 is now pressurized and lead 82 is depressurized to pivot guide rod 64 anti-clockwise as viewed in FIG. 3 about the coupling 66. Rack 58 is therefore free to move upwards without rotating pinion 60. The pressurization of leads 76, 78 is now reversed so that piston 54 is driven upwardly carrying slider 62 and rack 58 upwards towards the starting position. During this motion, finger 88 mounted on slider 62 engages the underside of a lever 90 which projects from the plate 47 secured to extension 46. As such, the finger 88 and lever 90 act as abuttments for each other. When the finger 88 first engages the lever 90, the latter being in the dashdot position shown in FIG. 3, upward movement of the slider 62 and finger 88 rotates the lever 90, projection 46 and sleeve 34 about the axis of shaft 14 to return them towards the starting position. Thus, the slider 62, finger 88 and lever 90 constitute a return device to return the sleeve 34 to its original position. Since rack 58 does not engage pinion 60, there is no accompanying rotation of housing 30 and once again there is sliding friction between the sleeve 34 and the housing. However, this again has no operational significance because at this stage winding pressure is not applied via shaft 14.

When the slider 62 reaches its uppermost position, pressurization of the leads 80, 82 is reversed so that guide rod 64 is returned to the disposition shown in FIG. 3 and rack 58 once again engages pinion 60. Finger 88 slides along lever 90 to the position illustrated in full lines in FIG. 3. The member 84 is now almost fully extended so that lever 90 and projection 46 cannot be rotated very much further in the anti-clockwise direction, thereby preventing accidental damage to the leads 52. When the pressurization of the lower chamber of the cylinder 53 is adjusted to a desired level, the parts are now ready to repeat the sequence of operations described above. It will be understood that since finger 88 is free to move relative to lever 90, the finger 88 simply moves downwards away from lever 90 when the latter is in the dash-dot position shown in FIG. 3, and the length of the lever 90 is sufficient to ensure that finger 88 will engage the lever 90 during upward motion of the finger 88, even though guide rod 64 is then pivoted to the right when compared with its position shown in FIG. 3. The above completes the description of the operation of the fluid coupling itself. By way of completeness of description of the illustrated parts, reference is made to the tubular shaft 92 which surround shaft 14 and projects through the sleeve 34 so that the end of the shaft 92 lies within projection 46. This free end of shaft 92 is coupled with a drive band 94 and the tubular shaft 92 is mounted in bearings 96 in plate 24 so that it can be rotated independently of shaft 14. Shaft 92 drives an acceleration ring on the carrier 12, the acceleration ring serving to bring a chuck 16 up to operating speed before it contacts friction drive drum 18. This arrangement forms no part of the present invention, but in the illustrated embodiment the angular extent of the segment-shaped projection 46 around the axis of shafts 14 and 92 must be limited to provide freedom of access for band 94 to shaft 92 throughout rotation of sleeve 34 and projection 46.

The invention is not limited to the embodiment illustrated in the drawings. A fluid coupling in accordance with the invention may be used with textile machines other than bobbin revolvers and with bobbin revolvers other than those described above. In particular, the exact sequence of rotations of the parts of the fluid coupling is not essential to the invention. For example, in the illustrated embodiment, carrier 12 is rotated persistently in one direction only, necessitating a free wheel connection between pneumatic cylinder 52 and shaft 14. The mechanical arrangement could, however, be such that the chucks 16 are brought into contact with respective winding points on opposite sides of a radial plane passing through the axis of the drum 18, so that the direction of motion of carrier 12 is reversed each time a chuck 16 engages drum 18. In this case, there may be no need for a return device, such as finger 88 and lever 90, to return projection 46 from the dash-dot to the full line position shown in FIG. 3. The sleeve 34 will merely be "picked up" by housing 30 during the reverse rotation of the latter and carried along to the limit of extension of member 84. With such a reversible arrangement, it may be possible to arrange the mechanism so that the grooves extend around only a portion of the periphery of the sleeve 34.

Even with this arrangement, however, the degree of rotation permitted for two parts will be different, because a two-part coupling (with continous or arc-type grooves) only has a purpose if the permitted angle of rotation of one part is less than that of the other, usually because of the necessity to connect the one part to fixed equipment such as a pressurized air source. In the case in which housing 30 rotates continually in one direction, as illustrated in the drawings, it is clearly impossible to permit sleeve 34, with the connected flexible leads 52, to follow this continual rotation. The angle of rotation permitted to the projection 46 and sleeve 34 may vary from that illustrated in FIG. 3, but these parts will usually be rotatable through less than 180°. In same instances, the one part may be rotatable through limited angular increments rather than between fixed angular positions, for example pending adjustment of other equipment on the machine-frame. Where the one part is limited to rotation between fixed positions, means alternative to the telescopic member 84 may be used to limit to rotation.

The invention is not limited to pneumatic couplings. The arrangement shown could be used to transmit pressurized liquid or a vapour (mist). Further, the number of channels, the form of each channel and the type of sealing means between them can be selected to suit the circumstances of use. For example, the channels could be formed by facing grooves in housing 30 and sleeve 34, but this is an undesirable option because it requires accurate location of the sleeve relative to the housing in order to align the grooves axially. Obviously, the grooves could be provided in the exterior of the sleeve 34 instead of in the interior of the housing 30. Further, in an alternative arrangement, the part 34 might be secured to the plate 24 for rotation therewith and the surrounding part 30 might have the flexible leads 52 secured thereto.

Where the grooves are formed in one only of the coupling parts, as illustrated in the drawings, and extend over part only of the circumference of the facing surfaces, it is not essential to the present invention that the passages in the other coupling part communicate with the grooves throughout relative rotation of the coupling parts. Whether or not this is necessary depends entirely upon the required mode of operation of the pressure fluid devices on the chuck carrier, and as indicated above that mode of operation is not important to this invention. It would be possible, for example to perform a switching function by having a passage in the non-grooved part move out of communication with the groove in the other part at a predetermined stage of relative rotation of those parts.

Further, it is not essential to the invention that each groove be pressurised continuously during operation. The devices provided on the carrier 12 may comprise a fluid logic unit requiring intermittent pressurisation to perform a control function in accordance with same prearranged cycle. In one convenient arrangement, pinion 60 is provided with a member shown with dotted lines at 96 in FIG. 2: this member is provided at a particular location on the pinion or extends around only part of the periphery of the pinion. A sensor (not shown) is provided on the machine frame and is responsive to the angular position of member 96 relative to the axis of shaft 14. The sensor is connected into an electrical circuit (not shown) which is thus responsive to the current disposition of the pinion 60 and carrier 12 which rotates therewith. Hence, the circuit is responsive to which chuck, 16 A or 16 B, is currently in the winding condition. The electrical circuit may control a valve (not shown) in one of the leads 52 to control pressurisation/depressurisation of the corresponding groove 38 in dependence upon which chuck is in the winding condition. The depressurisable groove 38 may feed a fluid logic unit which controls switching of pressure from the other grooves 38 to perform appropriate operations as the carrier 12 rotates. The sensor is preferably of the non-contact type to avoid introduction of sliding friction.

In FIG. 2 only five passage 42 in housing 30 are shown—one for each groove 38. In that Figure they all appear at about the same angular disposition about the axis of the housing. Clearly, there can be two or more passages 42 leading from each groove 38 depending upon the demand on the carrier and the ability of a single groove to supply that demand. The various passages can be spaced angularly around the housing axis as is found most convenient for production and assembly of the machine. In one convenient arrangement, there are two sets of passages in housing 30; each set comprises five passages which are associated with respective grooves 38, i.e. two passages per groove. The passages of one set supply devices associated with one chuck and the passages of the other set supply devices associated with the other chuck. The passages of the first set are angularly aligned and the passages of the second set are angularly aligned, but the two sets are spaced angularly, say, 180° about the housing axis.

Where the grooves are used to communicate hydraulic pressure rather than pneumatic pressure, it will be necessary to provide a flow circuit comprising both a "go" groove and a "return" groove. For this reason, the coupling is more conveniently used to transmit air pressure, the air being exhausted to atmosphere after use on the carrier.

What is claimed is:

1. A textile machine comprising a member rotatable about a predetermined axis, and a pressure-fluid coupling for transmitting pressure fluid to and/or from the member, said pressure-fluid coupling comprising, a first part fixed to said member for rotation therewith and a second part co-pending with said first part to define at least one circumferential channel therebetween, said first and second parts being capable of relative rotation, a pressure-fluid passage in said first part and a pressure-fluid passage in said second part, each passage communicating with said channel to permit transfer of pressure fluid from one passage to the other via said channel, said first and second parts being arranged for rotation together in at least one direction through a limited angular rotation of said second part, said first part being rotatable through a larger angle in said direction.

2. A textile machine as claimed in claim 1, wherein said second part is rotatable between fixed first and second positions.

3. A textile machine as claimed in claim 2, wherein said first part is continuously rotatable in at least said one direction and a return device is provided to return the second part from its second to its first position.

4. A textile machine as claimed in claim 3, wherein said return device is driven from the same source of motive power as said rotatable member.

5. A bobbin revolver comprising a chuck support rotatable about a predetermined axis and a pressure-fluid coupling for transmitting pressure fluid to and/or from the chuck support, the coupling comprising a first part fixed to the chuck support for rotation therewith and a second part co-operating with the first to define a plurality of circumferential channels between them, sealing means between the first and second parts to isolate said channels from each other while leaving said first and second parts capable of relative rotation, for each channel a pressure-fluid passage in the first part and a pressure-fluid passage in the second part, each said passage communicating with its channel to permit transfer of pressure fluid from one said passage to the other said passage via said channel, said first and second parts being arranged for rotation together in at least one direction between fixed first and second angular positions of said second part, the first part being rotatable in at least said one direction through a larger angle than said second part.

6. A bobbin revolver as claimed in claim 5, wherein said first part is continuously rotatable in at least said one direction and a return device is provided to return said second part from the second to the first position thereof.

7. A bobbin revolver as claimed in claim 6, wherein said return device is driven from the same source of motive power as the chuck support.

8. A bobbin revolver as claimed in claim 7, wherein the source of motive power for the chuck support comprises reciprocable drive means and the return device comprises abutments associated respectively with said second part and said drive means so that said abutments engage a predetermined portion of the reciprocation of said drive means.

9. A bobbin revolver as claimed in claim 5, comprising a drive for the chuck support adapted to apply thereto a substantially prdetermined turning moment during rotation of said second part in said one direction between said first and second positions thereof.

10. A bobbon revolver as claimed in claim 9, wherein said first and second positions correspond respectively with the beginning and ending of winding of a package of filament on a chuck carried by said chuck carrier.

11. A bobbin revolver as claimed in claim 10, wherein the turning moment urges the chuck against a friction drive means rotatably mounted in a frame of the revolver.

12. A bobbin revolver as claimed in claim 5, wherein said sealing means comprises a plurality of sealing rings.

* * * * *

UNITED STATES PATENT AND TRADEMARK OFFICE
CERTIFICATE OF CORRECTION

PATENT NO. : 4,213,573

DATED : July 22, 1980

INVENTOR(S) : Kurt Schefer; Jakob Fluck

It is certified that error appears in the above—identified patent and that said Letters Patent is hereby corrected as shown below:

Column 5, line 12, change "inbetween" to -- in between --.

Column 5, line 58, after "annular grooves" insert -- or channels --.

Column 5, line 59, after "grooves" delete -- or channels --.

Column 6, line 30, change "thereto to plate" to -- thereto a plate --.

Column 6, line 33, after "in" insert -- the --.

Column 7, line 13, change "constant and varies" to -- constant or varies --.

Column 8, line 37, change "surround" to -- surrounds --.

Column 8, line 1, change "abuttments" to -- abutments --.

Column 9, line 11, change "continous" to -- continuous --.

UNITED STATES PATENT AND TRADEMARK OFFICE
CERTIFICATE OF CORRECTION

PATENT NO. : 4,213,573
DATED : July 22, 1980
INVENTOR(S) : Kurt Schefer; Jakob Fluck It is certified that error appears in the above—identified patent and that said Letters Patent is hereby corrected as shown below:

Column 9, line 22, change "In same" to -- In some --.

Column 9, line 29, before "rotation" delete -- to --.

Column 10, line 20, change "five passage" to -- five passages --.

Column 11, line 4, delete "the" and insert -- said --.

Column 12, line 11, after "engage" insert -- during --.

Signed and Sealed this

Ninth Day of December 1980

[SEAL]

*Attest:*

SIDNEY A. DIAMOND

*Attesting Officer*    *Commissioner of Patents and Trademarks*